United States Patent Office 3,006,669
Patented Oct. 31, 1961

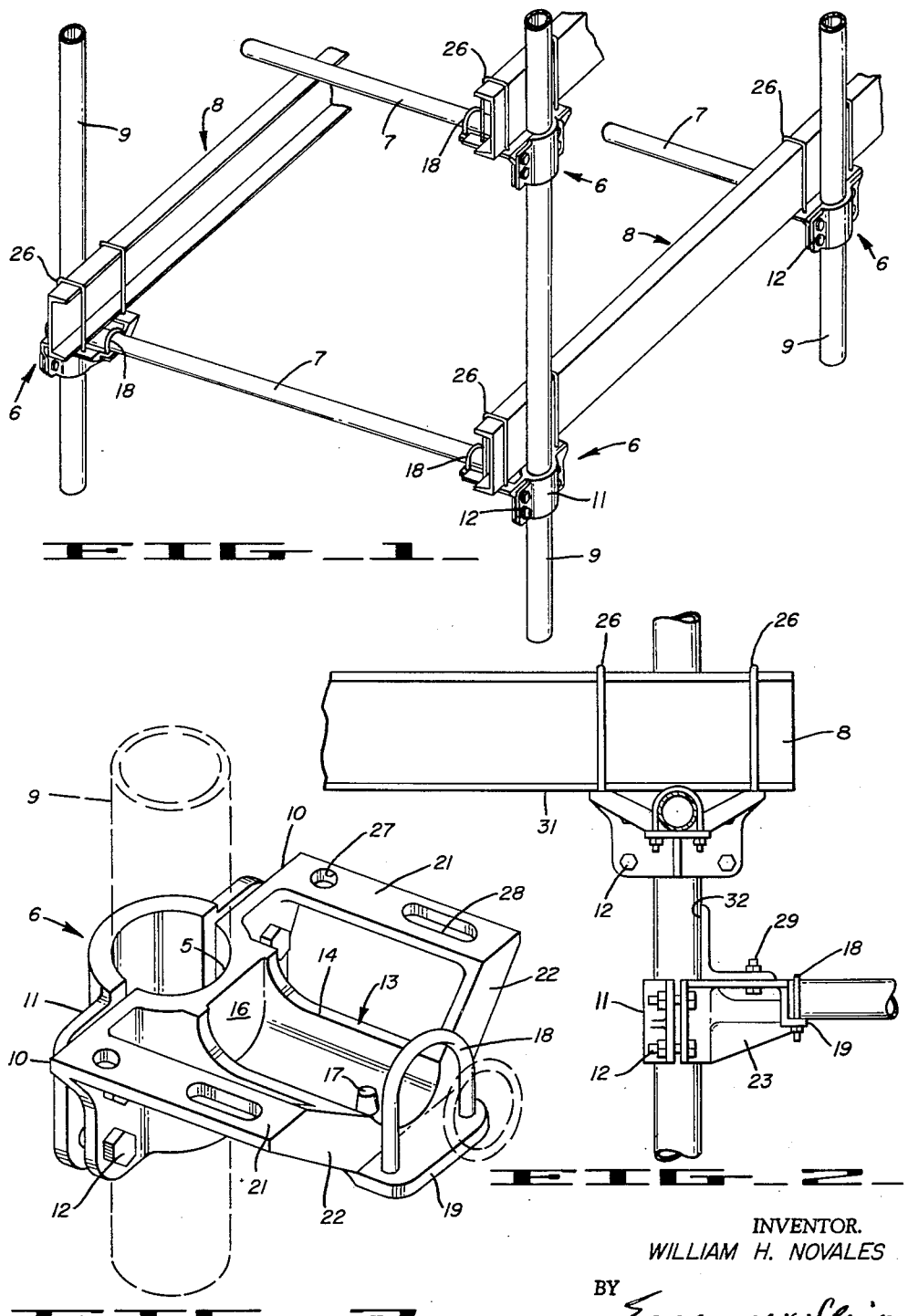

3,006,669
SHELVING CLAMP
William H. Novales, 20 Pacific Ave.,
San Francisco 11, Calif.
Filed June 30, 1958, Ser. No. 745,411
2 Claims. (Cl. 287—54)

This invention relates to a clamp, useful in the assembly of storage racks, shelving and the like.

It is common practice to provide storage shelving in which the support is provided by various horizontal and vertical structural members clamped together at intervals to provide support surfaces of a desired size and elevation. Various clamping means have been proposed, but each of these has been subject to some failing or objection. For example, the major load carrying members in the prior clamps were provided by ordinary tubes of pipe. Since these are notoriously weak except where used as a column, the constructed rack lacked strength and rigidity.

The clamp of the present invention is designed for use with pipe elements wherein the pipes act as columns or bracing but not as structural load-carrying members providing the major support for the load. In addition, the clamp is so provided that the three elements join together to provide a corner structure and are so united that no flexing or movement can occur between them. In this fashion, the assembled structure is made highly resistant to any overturning or sway force which may be applied by an earthquake or the like.

It is in general the broad object of the present invention to provide an improved clamp structure, one which is of materially simplified construction, and which can be used to clamp together several support members to provide a corner structure in providing storage racks and the like.

The invention includes other objects and features of advantage, some of which, together with the foregoing, will appear hereinafter wherein the present preferred form of clamp structure of this invention is disclosed. In the drawing accompanying and forming a part hereof, FIGURE 1 is a perspective view showing a portion of an assembled storage rack utilizing the clamp of the present invention.

FIGURE 2 is a side elevation, partly in section, showing several clamps arranged upon a single vertical support.

FIGURE 3 is a perspective view, illustrating a clamp partially assembled in position upon a vertical member.

Referring to the drawing and particularly to FIGURE 1 thereof, the clamp means of this invention is generally indicated by 6. It is adapted, as will be described, to join together a first horizontal pipe column bracing member 7, a second horizontal load support member generally indicated at 8, and a vertical pipe column member 9. Several clamps 6 are provided at desired elevations on the vertical members 9 to provide shelving support of a desired size and at a desired elevation.

The clamp 6 comprises a unitary body having a planar face portion 10 provided with a semi-cylindrical recess 5 adapted to fit approximately half of the vertical pipe support 9. A cooperating semi-cylindrical clamp 11 is adapted to fit about the remainder of the vertical pipe 9 in clamping engagement, the clamp 11 being joined to the planar face portion by bolts 12, the two cooperating to clamp the vertical pipe rigidly so that the assembled clamp 6 is positioned at the desired elevation on the vertical pipe support.

Extending rearwardly from the body is a semi-cylindrical support, generally indicated at 13, and defined by opposite arcuate walls 14 to provide a support for the horizontal column bracing pipe member 7. The end of the cylindrical receptacle 13 is provided with a planar face 16 against which the end of pipe 7 abuts. A projection 17 is provided in the bottom of the semi-cylindrical portion 13 and is adapted to extend into a suitable hole cut in tthe pipe 7. The pipe 7 is secured in place by a U-bolt 18 extended through a flat ear 19 provided upon the rear of the semi-cylindrical portion 13. With the U-bolt securing the pipe in place and with the pipe engaged on the projection 17 and fitting flush against the flat face 16, there is no opportunity for movement between the pipe 7 and the clamp unless some element fails structurally.

To provide support for the horizontal support member 8, a pair of horizontal wings or pads 21 extend rearwardly from the planar face portion to provide planar support surfaces. Each of the wings 21 is, in turn, joined by a gusset 22 to the central portion 13, and central portion 13 is in turn reinforced by a gusset 23, which extends inwardly to the central portion of the body, as is shown in FIGURE 2.

The member 8 is secured to the wings or pads 21 by extending a U-bolt 26 through an aperture 27 and a slot 28 in each of the pads, as in FIGURE 1 and the upper portion of FIGURE 2. When an angle-iron is attached, as in the lower right-hand portion of FIGURE 2, attachment is made by inserting a bolt 29 through the web of the angle-iron. In any case, it is to be noted that the planar underside 31 of either type of structural horizontal support rests flush and fits snugly against the face of each wing or pad 21 and upon the pipe 7 inserted in the cylindrical portion 13, as appears in FIGURE 2. Also, the vertical planar face 32 of the structural member 8 fits snugly against the vertical support 9 so that the entire structure is rigidly joined together and any freedom of movemen is so restricted as to be absent in a practical sense.

The clamp 6 can be fabricated of plate and welded or cast as desired of any suitable metal. The heavy supported load is carried on the horizontal members 8 which are suited to this, while the column load is carried by the upright pipes and the bracing load by the horizontal pipes. In use, wooden cross members can be placed across the several horizontal load support members 8, being suitably secured to these. If desired, however, these support members can be mounted with their ends within the channels 8 so that their ends are not exposed, thus making the structure more acceptable for display purposes.

I claim:

1. A clamp comprising: a first and a second curved body part forming opposite segments of a cylinder and adapted to engage a vertical pipe on opposite sides thereof; a pair of flange extensions on opposite sides of each of said body parts, the flange extensions on each of the said body parts being substantially parallel to the flange extensions on the other body part, each pair of said flange extensions lying in the same plane; a semi-cylindrical support integral with the first of the said body parts, said support being secured to said first body part intermediate the said flanges thereof and directly opposite the portion thereof adapted to engage a vertical pipe, said semi-cylindrical support extending in a direction normal to the said plane of the said flange extensions of the said first body part, the supporting surface of said semi-cylindrical support lying in a horizontal plane when said body portion is engaged with a vertical pipe, said semi-cylindrical support having means thereon permitting a horizontal pipe to be secured thereto; a wing integral with each of the said flange extensions of said first body portion, said wings being positioned at either side of the said semi-cylindrical support, said wings extending parallel to the said semi-cylindrical support and normal to the said flanges, said wings being mounted in a plane above the plane of the said semi-cylindrical support when the said first body portion is engaged with a vertical pipe, each of the said wings having means thereon permitting a horizontal member to be secured thereto.

2. The structure of claim 1 wherein each of the said wings is supported at the end thereof farthest removed from the said supporting flanges by means of rigid members integral with the said ends of the said wings and the said semi-cylindrical support.

References Cited in the file of this patent

UNITED STATES PATENTS

| | | |
|---|---|---|
| 2,847,237 | Ackerman | Aug. 12, 1958 |
| 2,906,551 | May | Sept. 29, 1959 |